UNITED STATES PATENT OFFICE.

JOSEPH LAMBERT, OF BATTLECREEK, MICHIGAN.

GRANULAR MALTED BISCUIT AND METHOD OF MAKING SAME.

SPECIFICATION forming part of Letters Patent No. 701,742, dated June 3, 1902.

Application filed November 7, 1901. Serial No. 81,453. (No specimens.)

*To all whom it may concern:*

Be it known that I, JOSEPH LAMBERT, a citizen of the United States, residing at Battlecreek, in the county of Calhoun and State of Michigan, have invented certain new and useful Improvements in Granular Food-Biscuits and Processes of Making the Same; and I do hereby declare the following to be a full, clear, and exact description of the invention, such as will enable others skilled in the art to which it appertains to make and use the same.

My invention relates to a cereal food product, which may be in the form of a granular biscuit, and to the process for producing the same; and the invention consists in taking a suitable quantity of malt and removing the hulls therefrom, grinding it into flour, and mixing with the same a suitable quantity of flour made from whole wheat. The flours thus mixed are made into a dough by adding water, salt, a suitable shortening and a leavening agent, and allowing the same to properly leaven, then forming the dough into loaves of suitable size and shape and baking the same, then cutting the bread into thin slices, then thoroughly browning or toasting these slices, thus changing most of the starchy matter to soluble dextrine and reducing the thus browned or toasted slices to a granular condition by grinding or crushing and mixing the granules with an agglutinant—such as extract of malt, glucose, molasses, white of egg, or other suitable substances—which will cause the granules to adhere, then molding into biscuits or cakes of suitable size and shape, and then drying out by rebaking or otherwise.

The object of my invention is to produce a dextrinized cereal food product which is coarsely granular, friable, and will readily absorb liquids, such as milk, cream, or hot water. Heretofore difficulty has been experienced in producing such a product, the biscuits heretofore produced being very hard and requiring a large amount of soaking, and consequently causing much annoyance and loss of time, and often then the particles when separated are in a hard condition and require considerable mastication before they are in a condition to be taken into the stomach.

In carrying out my invention I take a suitable quantity of malt, preferably barley-malt, and remove the hulls therefrom and reduce it to a flour. I then mix with the same a suitable quantity of wheat-flour, made, preferably, from whole wheat. The proportions in which the flours are mixed are preferably one-third malt-flour and two-thirds wheat-flour. The flours thus mixed are made into a dough by adding water, salt, a suitable shortening, (preferably nut-oil,) and yeast or other leavening agent, and the dough allowed to properly leaven. It is then formed into loaves of suitable size and shape, preferably long round loaves, and then baked until a thin brown crust is formed upon the same, the heat employed being sufficient to bake the bread thoroughly throughout the entire mass. The baked loaves are then cut into thin slices, and the slices are thoroughly browned or toasted, care being taken not to burn the same. Most of the starchy matter is thus converted into dextrine. The toasted slices are then reduced to granular form by grinding or crushing, and the granules are then mixed with an agglutinant—such as extract of malt, glucose, molasses, white of egg, or any other suitable substance, but preferably extract of malt, which will cause the granules to adhere. The granules are then formed into biscuits or cakes of suitable size and shape and then dried out, preferably by baking. The product thus produced will be found to be palatable, coarsely granular and friable, and when a liquid—such as cream, milk, or hot water—is brought into contact with the same the granules will readily absorb the same and be ready for instant use. I attribute these valuable results largely to the fact that the flour is leavened before being baked and toasted and ground.

While I have described my food product as being made into the form of a biscuit or cake, and while that is the form in which I shall place it on the market, and while I believe it is a decided step in the art to be able to produce a granular food product in the form of a biscuit which will readily absorb liquids, yet I do not wish to be limited to always making the food product into biscuit form.

Having fully described my invention, what I claim as new, and desire to secure by Letters Patent of the United States, is—

1. As a new article of manufacture, a food product made from a leavened dough containing malted-barley flour and whole-wheat flour, said product being in molded form baked and dextrinized, coarsely granular, friable and readily absorbent and containing extract of malt for holding the granules together, substantially as described.

2. As a new article of manufacture, a food product made from leavened dough containing malt-flour and whole-wheat flour, baked and dextrinized, in the form of biscuits which are coarsely granular, friable and readily absorbent, and containing a digestive agglutinant for holding the granules together, substantially as described.

3. The herein-described process of producing a granular food-biscuit which consists in mixing malt-flour with whole-wheat flour and adding thereto water, salt, shortening and a leavening agent, to form a dough and allowing the dough to properly leaven, then forming into loaves and baking, then slicing, and browning or toasting said slices, next reducing to granular condition by grinding or crushing, next adding a digestive agglutinant, then molding into suitably-shaped biscuits or cakes, and then drying out, substantially as described.

4. The herein-described process of producing a granular food-biscuit, which consists in mixing malted-barley flour with whole-wheat flour, and adding thereto water, salt, shortening and a leavening agent to form a dough, and allowing the dough to properly leaven, then forming into loaves and baking; then slicing and toasting said slices, next reducing to granular condition, then adding extract of malt, then molding into suitable shapes and then drying out by rebaking, substantially as described.

5. The process of producing a granular food product which consists in taking malt and removing the hulls therefrom and grinding it into flour, mixing it with a suitable quantity of wheat-flour; then making a dough of the mixed flours by adding water, salt, shortening and leavening, permitting the same to properly leaven; then forming into loaves of suitable size and shape and baking the same; then cutting into thin slices, then browning or toasting the slices and reducing the thus browned or toasted slices into granules by grinding or crushing, and mixing the granules with extract of malt for causing the granules to adhere, and then rebaking, substantially as described.

In testimony whereof I hereunto affix my signature in presence of two witnesses.

JOSEPH LAMBERT.

Witnesses:
EDWARD T. FENWICK,
JOHN L. FLETCHER.